(12) United States Patent
Nabekura et al.

(10) Patent No.: US 7,047,367 B2
(45) Date of Patent: May 16, 2006

(54) INFORMATION PROCESSING DEVICE AND SETTING METHOD FOR SAME

(75) Inventors: Yuko Nabekura, Tokyo (JP); Yoshinori Igarashi, Tokyo (JP); Tomoyuki Kato, Tokyo (JP); Koichi Hori, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 329 days.

(21) Appl. No.: 10/600,801

(22) Filed: Jun. 19, 2003

(65) Prior Publication Data
US 2004/0066699 A1 Apr. 8, 2004

(30) Foreign Application Priority Data
Oct. 3, 2002 (JP) ............................. 2002-290588

(51) Int. Cl.
*G06F 12/00* (2006.01)
(52) U.S. Cl. .................. 711/147; 711/170; 710/10; 713/1
(58) Field of Classification Search ................ 719/327, 719/328; 713/1; 700/220
See application file for complete search history.

(56) References Cited

U.S. PATENT DOCUMENTS

| 5,237,689 A | 8/1993 | Behnke |
| 5,430,855 A | 7/1995 | Walsh et al. |
| 5,721,952 A | 2/1998 | Lin et al. |
| 5,822,614 A | 10/1998 | Kenton et al. |
| 5,909,592 A | 6/1999 | Shipman |
| 6,578,091 B1 | 6/2003 | Musil |
| 6,823,526 B1 * | 11/2004 | Howard et al. ............. 719/327 |
| 6,904,599 B1 * | 6/2005 | Cabrera et al. ............ 719/328 |
| 2003/0055529 A1 * | 3/2003 | Aosawa ..................... 700/220 |
| 2003/0236971 A1 * | 12/2003 | Rothman et al. ............ 713/1 |

FOREIGN PATENT DOCUMENTS

| JP | 05-288088 | 2/1993 |
| JP | 06-214766 | 8/1994 |
| JP | 08-212096 | 8/1996 |
| JP | 2001-337863 | 12/2001 |

* cited by examiner

*Primary Examiner*—Mano Padmanabhan
*Assistant Examiner*—Craig E Walter
(74) *Attorney, Agent, or Firm*—Townsend and Townsend and Crew LLP

(57) ABSTRACT

An information processing device is provided which is capable of automatically initializing external apparatuses, when external apparatuses are connected thereto. A storage area for storing information identifying the type of external device connected to the information processing device and information identifying the characteristics of the external device is provided, and the external device connected is determined provisionally from information relating to the characteristics of an external device stored in the storage area, in cases where an external device of a type which is not present in the information processing device is detected.

16 Claims, 5 Drawing Sheets

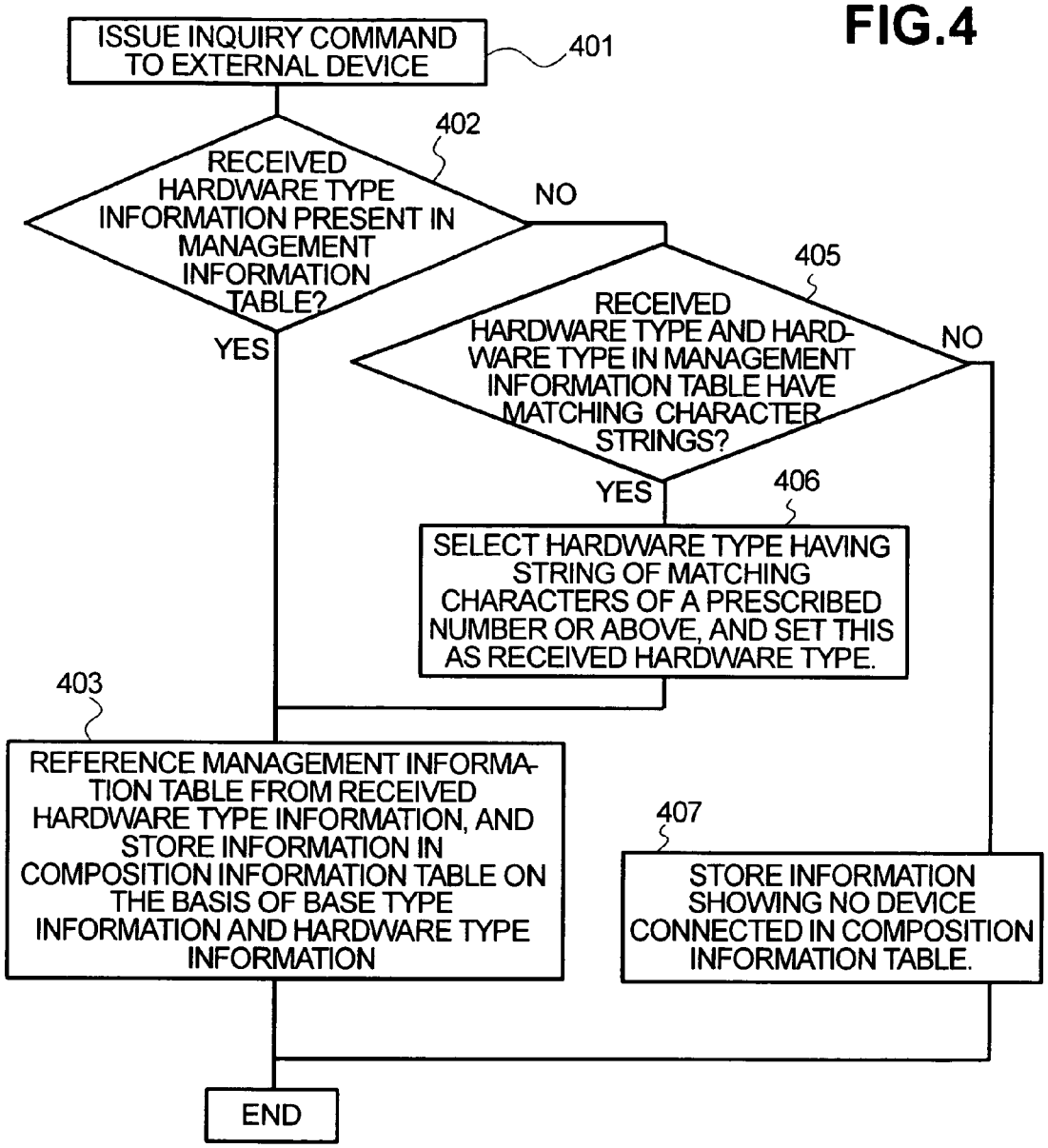

| MODEL C-D1 | NO. OF TRACKS 256 | NO. OF SECTORS 128 | NO. OF CYLINDERS 2 | EMULATION TYPE |
|---|---|---|---|---|
| 701 | 702 | 703 | 704 | 705 |

INFORMATION PROCESSING DEVICE AND SETTING METHOD FOR SAME

CROSS-REFERENCES TO RELATED APPLICATIONS

This application relates to and claims priority from Japanese Patent Application No. 2002-290588, filed on Oct. 3, 2002, the entire disclosure of which is incorporated herein by reference.

BACKGROUND OF THE INVENTION

1. Field of the Invention

The present invention relates to a setting method for an information processing device, and more particularly to a composition setting method when an external processing device is connected to the information processing device.

2. Description of the Related Art

A storage control device, which is one type of information processing device, holds information identifying storage devices, such as a hard disk, or the like, connected to the storage control device, and identifies a connected storage device on the basis of this information. The storage control device stores composition information, such as which regions the storage devices are to be divided into when used, and the like, in the form of a table. An operator can change this composition information as appropriate and set up the storage control device to a desired composition for use.

The composition information is saved in a shared memory inside the storage control device, in a table format, and a control section of the storage control device refers to this composition information and performs control whereby the memory region to be accessed by the host device, known as the logical volume, is positioned in the storage device, and the real region and logical volume region in the storage device are associated. This composition information table also stores information whereby the host device connected to the storage control device may access the logical volume, and information required for operations, such as which logical volumes the host computer is permitted to access.

Regardless of whether the operation is performed automatically or by an operator, in order to generate this composition information, it is necessary to have information on the physical composition connected to the storage control device, in other words, connection information relating to the peripheral devices, such as how many hard disks of what types are connected, and the like.

For this purpose, specific information for each type of device which may be connected externally is previously stored in the memory of the storage control device, the specific information of the devices being stored in association with the unique name of each device, such as its model number, or the like.

When a new external device is connected, the storage control device automatically makes an inquiry regarding the unique name (including model number) of the device, such as the model name of the device, and on the basis of the results of this inquiry, it specifies the attributes of the device by referring to the aforementioned device attribute information corresponding to respective types of external devices, which is previously stored in the storage control device.

Thereupon, the storage control device generates a composition information table using this attribute information.

As one example of automatic generation of composition information by an information processing device such as the storage control device described above, a method has been proposed wherein access path information to the devices in question is automatically associated with the unique device information, such as the device attributes, and the like, and collated in a format whereby it can be referenced by a control device controlling the various connected external devices (see, e.g., Japanese Patent Laid-open No. H5-28088).

However, in cases of this kind, it is necessary to predict in advance the types of device which may be connected to the information processing device, and to store capability information, and the like, for these devices in association with the model names of each device. As a result, it is not possible to adapt to cases where a new external device which is not predicted by the storage control device is connected. In particular, in the case of external devices such as a physical storage media, which are improving in capabilities at a dramatic rate, upgrade versions designed to improve performance are being provided in a successive fashion. It is of course impossible for all of the attribute information, and the like, relating to new external devices which are newly released onto the market, to be stored in advance in the information processing device.

On the other hand, even if the external devices connected to the information processing device are identified by some method or other, the subsequent task of generating composition information which determines the manner in which these devices are to be used has become increasingly complex in recent years (see, e.g., Japanese Patent Laid-open No. 2001-337863).

However, in order to operate a large scale storage control device, in particular, unless the storage control device assumes a state where it can access the external storage devices, and assign standard composition information to a certain extent, then the storage devices will not be able to perform initial operations, and hence the composition of the storage devices cannot be adjusted to an optimum configuration.

SUMMARY OF THE INVENTION

The present invention overcomes the aforementioned problems, and provides composition information for a state whereby a storage control device is able to function, by estimating the capabilities of newly incorporated hardware, such as external storage devices, and the like, from other information, even if the storage control device itself has not previously stored attribute information, or the like, for same.

In an information processing device connected externally to a plurality of devices according to an embodiment of the invention, the information processing device comprises a storage area for storing information relating to the plurality of devices, which is referenced when initializing the plurality of external devices. The storage area includes a first storage area for storing hardware type information comprising unique information assigned respectively to the plurality of devices, and a second storage area for storing attribute information corresponding to the unique information. For initializing a connected external device, the information processing device judges whether or not hardware type information obtained from the external device is stored in the first storage area, and if the obtained hardware type information is not stored in the first storage area, then the connected external device are initialized by referring to base type information relating to the external device obtained from the external device, and attribute information stored in the second storage area.

In other words, even in cases where the model name of the connected external device is not present beforehand in the management information table of the storage area, information relating to the composition of the information processing device is set by referencing the other information in the management information, in such a manner that composition information for managing the types of external devices which are connected to the information processing device can be generated automatically, as far as possible.

In accordance with an aspect of the invention, an information processing device for connecting to one or more external devices comprises a storage area configured to store information relating to a predetermined set of external devices, which is referenced when the one or more external devices to be connected to the information processing device are initialized. The storage area comprises a first storage area for storing hardware type information including unique information assigned respectively to the predetermined set of external devices, and a second storage area for storing attribute information corresponding to the unique information assigned respectively to the predetermined set of external devices. A processor is configured to obtain hardware type information and base type information from a connected external device and to determine, for initializing the connected external device, whether or not the hardware type information obtained from the external device is stored in the first storage area, and if the obtained hardware type information is not stored in the first storage area, to initialize the connected external device by referring to the base type information relating to the external device obtained from the external device, and attribute information stored in the second storage area.

In another embodiment, the processor is configured to compare the base type information relating to the characteristics of the external device obtained from the external device with the attribute information accumulated in the second storage area, and if the base type information matches the attribute information corresponding to the unique information assigned to one matching external device in the predetermined set of external devices, to initialize the connected external device by identifying the external device as the one matching external device.

In another embodiment, the processor is configured, if the obtained hardware type information is not stored in the first storage area, to compare the hardware type information obtained from the external device with the hardware type information stored in the first storage area, and to initialize the connected external device by using the base type information corresponding to the hardware type information stored in the first storage area which most closely resembles the obtained hardware type information.

BRIEF DESCRIPTION OF THE DRAWINGS

FIG. 4 is a flowchart showing a further example of a method of storing composition information according to an embodiment of the present invention;

FIG. 5 is a diagram showing one example of a management information table according to an embodiment of the present invention;

DESCRIPTION OF THE PREFERRED EMBODIMENTS

Embodiments of the present invention are described with reference to the drawings. In this embodiment, a detailed description is given of an example case wherein the information processing device is a storage control device and the external device connected thereto is a disk storage device.

Figure 1:
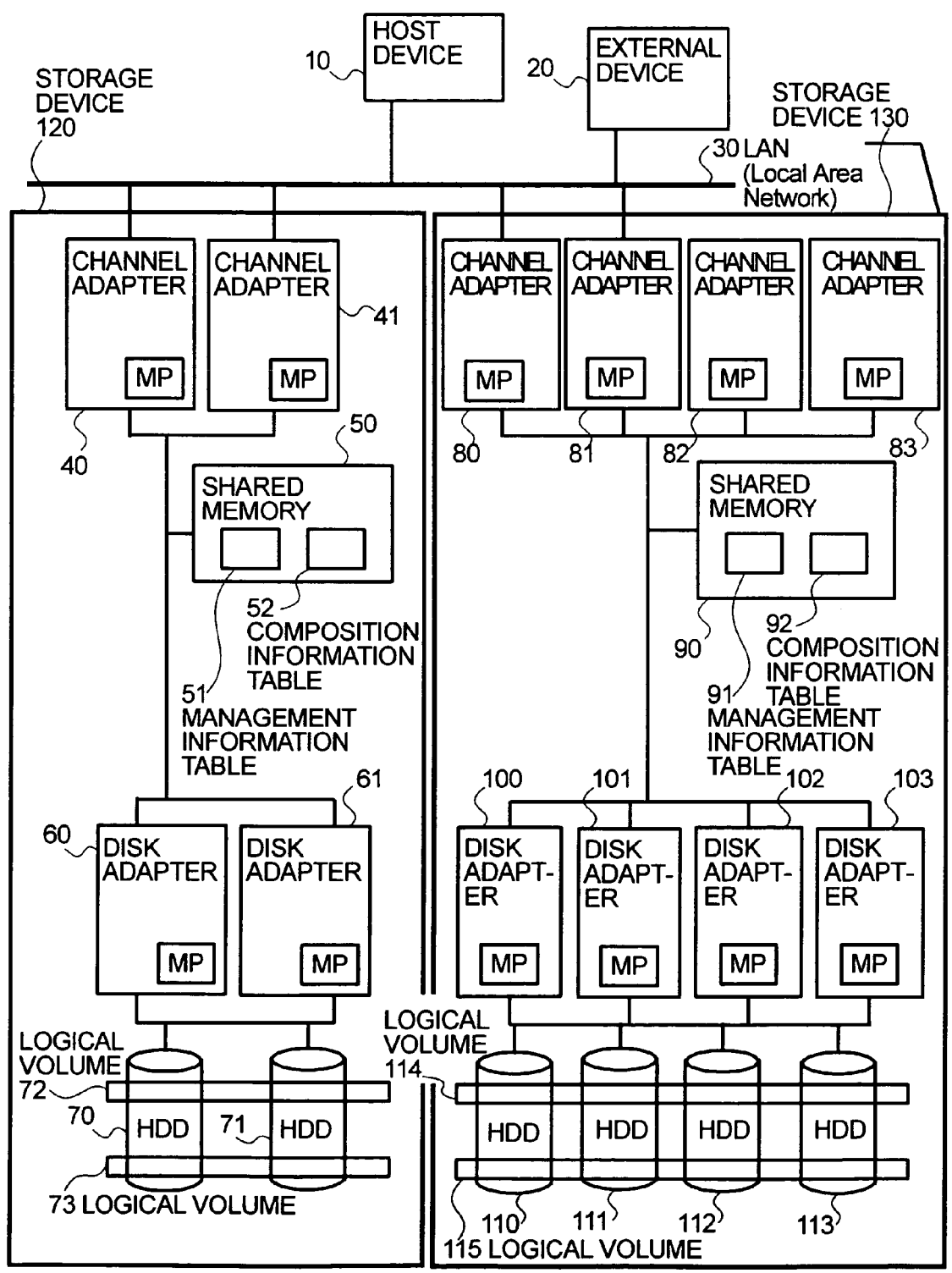
FIG. 1 is a block diagram showing hardware illustrating an embodiment of the present invention.

FIG. 1 is a block diagram showing one example of a computer system constituted by combining a storage system comprising storage control devices and external disk devices, such as magnetic disk devices, or the like, with a host device by means of a LAN (Local Area Network), in other words, a computer system in a so-called NAS (Network Attached Storage) environment.

In FIG. 1, the host device 10 is a host computer which requests writing or reading of data to a storage control device. The host device 10 and an external terminal 20 are connected via a LAN (Local Area Network) 30 to any of respective channel adapters 40, 41, 80, 81, 82 and 83. By means of these connections, information can be exchanged between the storage control devices 120, 130, and the host device 10 and external terminal 20.

The respective storage control devices are constituted in hardware terms by a separate and unique set of components (modules), as indicated by the channel adapters, 40, 41, 80, 81, 82, 83, shared memories 50, 90, disk adapters 60, 61, 100, 101, 102, 103, and magnetic disk drives 70–71, 110–113. The channel adapters and disk adapters are provided with microprocessors, which control exchange of data, and the like, in accordance with a microprogram.

The magnetic disk drives 70, 71, 110, 111, 112, 113 are physical storage media, and in the present embodiment, they are hard disk drives. These hard disk drives are managed as logical volumes by the storage control devices 120, 130. Moreover, the storage control devices 120, 130 guarantee a storage region which can be recognized by the host device 10, by setting up the logical volumes 72, 73, 114, 115, formed by the storage regions of the plurality of hard disk drives. This process is called mapping, and is managed by means of mapping information. Writing and reading data to and from the host device 10 is controlled with respect to these logical volumes, the aforementioned microprocessors referencing the mapping information and performing control in such a manner that data reading and writing is performed at locations corresponding to the actual physical volume.

Information indicating the state of allocation of the logical volumes to the physical volumes forms a part of the composition information. In addition to this, the composition information sets the physical volume to which the host device has right of access, and the like.

In any case, in order to operate the storage control devices 120, 130, basic composition information of this kind is established prior to the start of operation.

The initialization control for the storage control device 120 in FIG. 1 is now described as an example of the startup operation of a storage control device. When the power supply is switched on, the microprocessors provided in the channel adapters 40, 41, and disk adapters 60, 61 perform initializing operations.

In these initializing operations, in order that the storage control device be able to identify the internal composition of the storage control device, register information for the respective hardware elements forming the storage control device is gathered and stored as an information element in a composition information table inside a shared memory, which is described hereinafter.

After the initialization of the disk adapters 60, 61, which are internal modules of the storage control device, has been completed, the startup operation of the hard disks 70, 71 is controlled by the microprocessors of the disk adapters. In the initializing operation and the beginning of the startup procedure, even in the case of a hard disk connected externally to the storage control device, the information relating to the hard disk device is stored in the composition information table in the shared memory 50, via the disk adapter.

If a problem of some kind occurs during the initialization or startup processing, then since information for the site generating the problem will not be stored in the shared memory, the same information will be stored in the shared memory as if the problematic device was not installed.

In FIG. 1, the shared memories 50, 90 are memories which can be referenced commonly by the respective processor of the same device, and inside these shared memories, composition information tables 52 and 92 storing composition information for the device, and management information tables 51, 91 for storing the models of devices which may be externally connected and the attributes thereof, in a table format, are recorded.

FIG. 5 shows one example of a management table. The device model 501 represents the unique name which is assigned to each device. The reference characters 503 and 504 refer to attribute information for that device, and they indicate the storage capacity and emulation type and the like.

The information stored in these management information tables 51 is composed in such a manner that it can be written from the external terminal 20, via the LAN 30.

Figure 3:
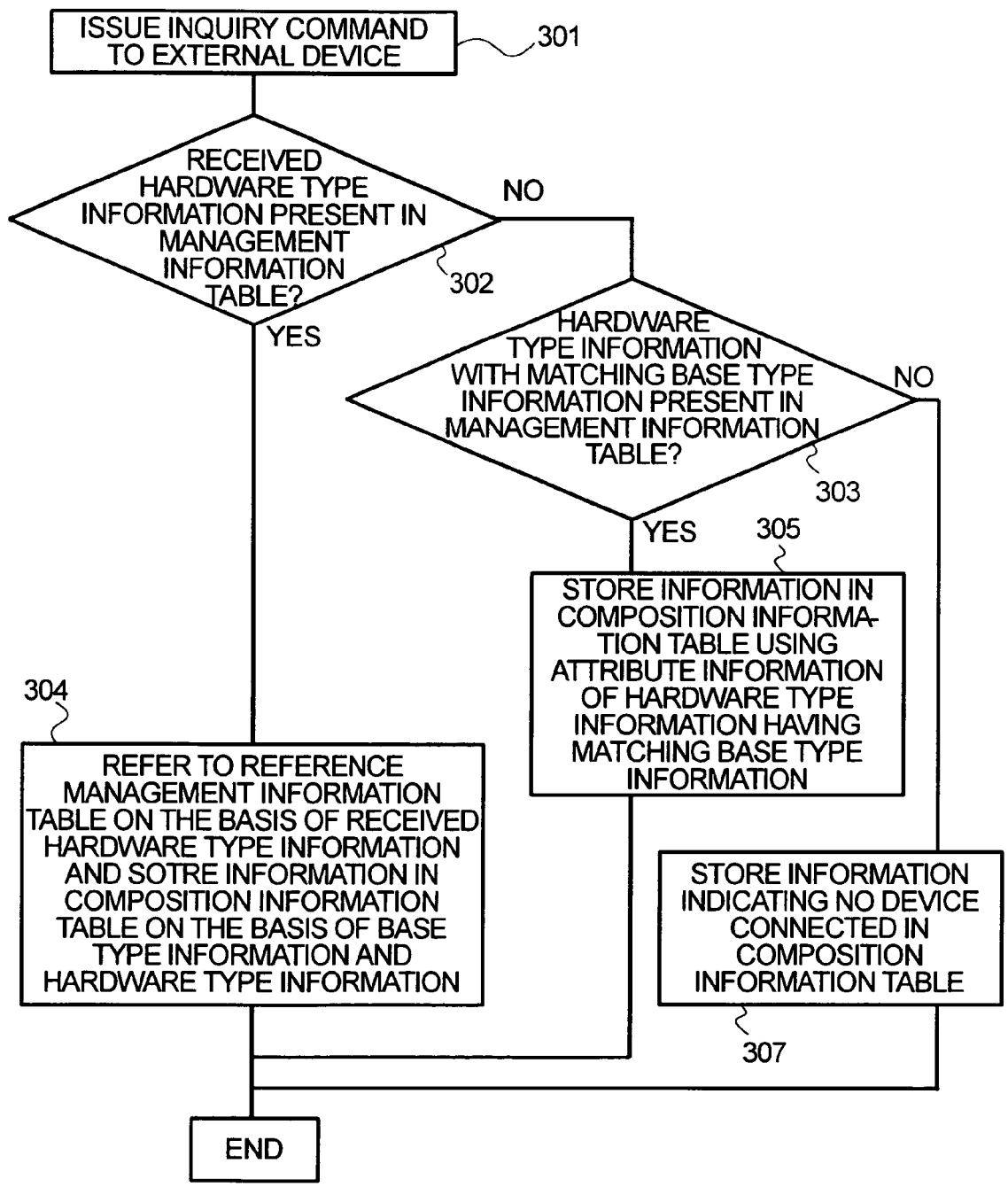
FIG. 3 is a flowchart showing one example of a method of storing composition information according to an embodiment of the present invention.

Below, the initializing operation is described in detail with reference to the storage control device 120 illustrated in FIG. 3. When the power supply of the storage control device 120 is switched on, the storage control device 120 issues an inquiry command to the respective sites which are switched on, in order to determine the composition of the storage control device itself, and the type of devices which are connected externally thereto.

When the initialization for the respective hardware elements constituting the internal structure of the storage control device (namely, the channel adapters 40, 41, shared memory 50, and disk adapters 60, 61) have been completed, the microprocessors provided in the disk adapters issue an inquiry command in order to verify if an external device is connected to that respective disk adapter, and if one is connected, to identify the type of device connected (301). The inquiry command issues commands for finding out the hardware type information and the base type information.

The hardware type information is information that is unique to each device type, such as the model name of an externally connected device, such as a hard disk, or the like, (hereinafter, this is called "hardware type information"), and the base type information is attribute information indicating the characteristics of that hardware (such as the capacity and emulation type), (hereinafter, called "base type information"). When an external device receives this command, it returns hardware type information and base type information to the microprocessor which issued the inquiry. As a further method, it is also possible for the processor of the disk adapter to obtain hardware type information and base type information by reading out the data recorded in a prescribed register of the connected hardware.

If no device is connected, or if there is a fault in the access path connecting to the external device, or the like, then no response is received, and in such cases, it is judged that no external device is installed and information indicating "no device installed" is stored in the composition information table 52.

The microprocessor of the disk adapter firstly refers to the management information table 51 in the shared memory to determine whether or not the hardware type information obtained has been previously stored (302). If there is a matching hardware type, then this means that the hardware type connected to that disk adapter already exists, and hence the disk adapter to which it is connected, and the hardware type information and base type information obtained, are stored in mutual association in the composition information table 52. In setting the logical volumes described above, logical volume mapping, and the like, is performed on the basis of the composition information stored at this time.

On the other hand, if the hardware type information does not exist in the management table, then it is judged that there is no device with matching base type information in the management information table 51.

Here, the base type information will be described. As described above, when the control device makes a request to an external device connected to the control device, for information for identifying the external device, then the external device returns the model name, device number, and the like, thereof. However, the information returned by the electrostatic capacitance type external force detecting device does not necessarily contain only the model number of the device, and the like, but is often returned in combination with other information relating to that hardware device.

An external storage device, as typified by a hard disk, or the like, is constituted in such a manner that it returns attribute information (base type information), such as capacity, and the like, in addition to the model name, and unique manufacturing code (the aforementioned hardware type information). Attribute information indicates the characteristics of the hard disk, and may include the number of sectors and number of tracks, in addition to the capacity.

In the present invention, rather than making automatic settings by focusing on the hardware type information, such as model, and the like, determined universally for the hardware type, in cases where that hardware type is not stored in the management information table 51 of the control device, other information (base type information) returned by the hardware in combination with the hardware type information is also referenced and automatic settings are made by detecting the attributes of the hard disks connected to the disk adapters of the storage control device 120.

In this first method, it is judged whether or not the base type information 506 in the management information table 51 contains information which is the same as, or interchangeable with, the base type information obtained from the external device. If a model having the same or interchangeable base information is registered, then the information storage processing to the composition information table assumes that a device of that model is connected and stores data accordingly.

In a second method, described with respect to a storage control device, provided that the capacity and emulation type of the hardware connected to the disk adapter (i.e., base type information) can be identified, then even if the unique device information, such as the model or serial number, or the like, of that device cannot be obtained, it is still possible to store information in the composition information table 52 relating to the hardware connected to the disk adapter, and consequently, even if the hardware corresponding to the hardware type information obtained at step 301 is not stored in the management information table 51, then at step 305, the required information is written to the composition information table 52 by referencing the base type information.

Figures 6, 7:
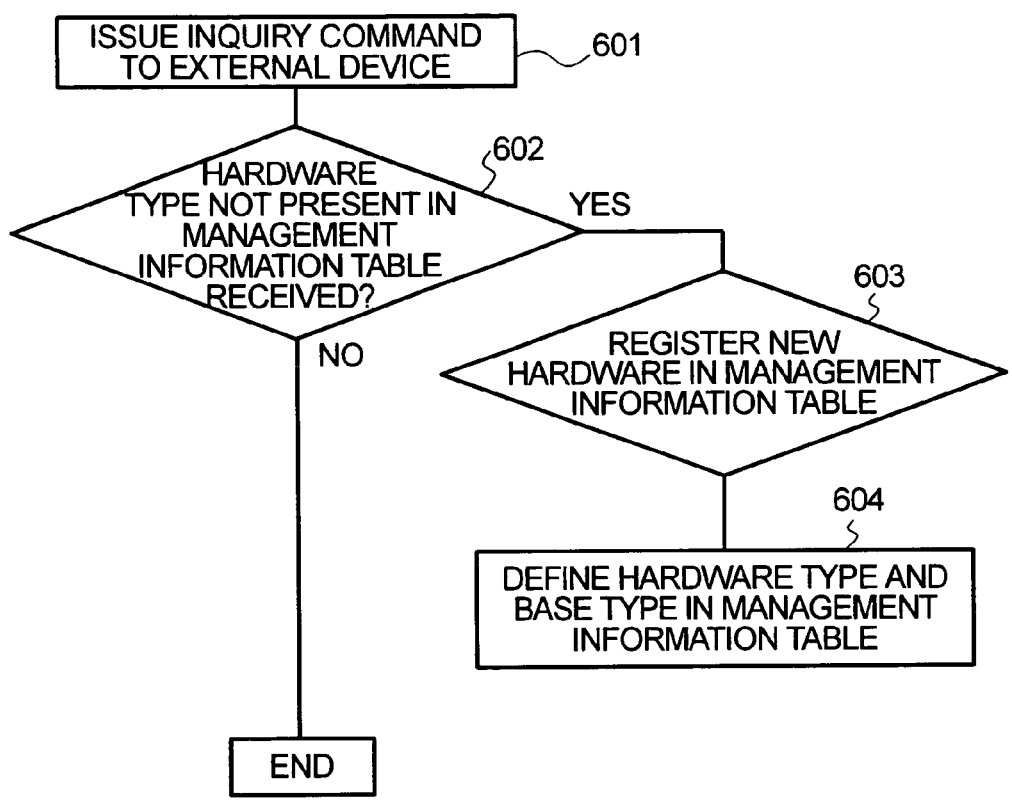
FIG. 6 is a flowchart showing a procedure in the case of updating the management information table.
FIG. 7 is a diagram showing one example of response information from a device in an embodiment of the present invention.

FIG. 7 shows one example of information returned by the hardware. The header record 701 of the response information relates to the model, the following record 702 indicates the number of tracks, and the subsequent records describe the number of sectors 703, the number of cylinders 704 and the emulation type 705.

At step 304, the microprocessors of the disk adapters 60, 61 store the required information in the composition information table 52, using the base type information, which is the response information from the hard disk connected externally.

If the capacity of the hard disk cannot be identified directly as in the information in FIG. 7, then a step should be added for calculating the capacity according to a prescribed calculation formula. In this example, it is possible to obtain the capacity by multiplying together the number of sectors, number of tracks and number of cylinders. A number of prescribed algorithms are written into the shared memories, or the like, in order to indicate which contents of the response information should be listed in which sequence, and the microprocessors should also be written with a program for considering whether or not data corresponding to the general capacity can be obtained by a trial and error test. This thinking program is sufficient provided that it is of a level capable of detecting the principal elements by sampling the composition of the base type information of incorporated products to this point.

If, after following the procedure in the first method and the procedure in the second method, it has not been possible to identify the information indicated in the composition information, such as the capacity and emulation type, then it is judged directly that this connection is not possible, and information indicating no device connected is stored in the composition information table 52 (307).

As shown in FIG. 6, it is possible to adopt a composition wherein, after the inquiry command (601) has been issued, and it is judged whether or not there is information which is the same as, or interchangeable with, the base type information in the composition information table 51 (602), if there is no corresponding information at all, the operator is warned of a new addition to the management table. In the case of a external device which has no similarity to previous devices, there is a high possibility that it will not respond at all to the storage control device, and hence a confirmation task is prompted to the operator.

If a device of completely different functional characteristics, and the like, is connected, then the storage control device may be fundamentally unable to support operation of that external device. In particular, if an external storage medium, such as a hard disk, in the storage control device, is expanded, or the like, then this will of course destroy the data stored in the hard disk, and hence in order to avoid situations of this kind, a warning is issued to the operator, and the device is treated as being disconnected.

In this case, moreover, a step (603) may be added for making an inquiry to the operator: "Register new external device in management table?"

In this case, the hardware type of the external device in question is registered in the management information table 51 of the shared memory 50, via the external terminal 20, thereby recording the performance and functional information of the device (604).

Accordingly, hereafter this new hardware disk will be detected as a matching hardware type, and the required information will be stored automatically in the composition information table 52.

A further embodiment is now described with respect to a case where the response information sent in reply to inquiry information from the control device does not contain base type information. In the preceding embodiment, it was presumed that base type information is detected together with the hardware type information, but responding to a request to "complete startup to a state where devices can be operated automatically as far as possible", this being the object of the present invention, does not necessarily depend on whether or not there is base information.

In this embodiment, a method is described which uses second information instead of the base information as a portion of the hardware type information.

In general, when a newly supplied device relates to an improvement of a base device, the character string of the header section of the model name often does not change, and the new model number is applied by updating the suffix portion thereof. In other words, if the information in the header section is matching, then it can be inferred that the hardware type is one which exceeds the capabilities of an existing device. Therefore, at least a model of the most recent base type is selected from the management table, and this hardware type is associated with the disk adapter.

Focusing on this point, a method according to the second embodiment is now described with reference to FIG. 4, wherein in cases where information having matching hardware type information is not included in the management information table 51, a device having a matching character string sequence of a certain threshold or above is provisionally determined to be connected to the disk adapter.

The microprocessor of the disk adapter issues an inquiry command regarding the hardware type to the external device (401). It is determined whether or not the incorporated hardware type is present in the management information table 51 (402). If it is present, then the information for that hardware type is selected and the necessary information is stored in the composition information table 52 on the basis of this information (403).

If, on the other hand, there is no matching information, then a search is made for information which can be determined provisionally to be matching. Here, several different provisional determination algorithms are investigated, and a threshold value for indicating whether or not 8 or more characters are matching, for example, is established, based on the principle of matching from the beginning of the word, and it is judged whether or not the information can be regarded to be matching up to or beyond the threshold value (405).

If there exists a hardware type regarded to have a prescribed number of matches or above, then that hardware type is determined provisionally to be the hardware type of the newly connected device, and that hardware type is selected (406).

Therefore, similarly to step 403, the device attribute information for the relevant hardware type in the management information table 51 is referenced and the necessary information is stored in the composition information table 52. In other words, it is regarded that a device of a partially matching hardware type is connected to that disk adapter, and composition information indicating an association between that disk adapter and a device of the relevant hardware type is stored (403).

If the character strings do not match the threshold value or above, then information indicating that no device is connected is stored in the composition information table 52, similarly to the case described previously where there is no interchangeable or similar base type information (407).

The greater the threshold value, the lower the possibility that inappropriate device recognition will be provisionally determined, but needless to say, the lower the possibility of accepting automatic connection. The threshold value should be set in consideration of the device composition and the guarantee level of the device, and the like.

Next, a procedure for setting the composition of the storage control device, on the basis of the information stored in composition information tables 52, 92 located in shared memories 50, 90 and generated automatically on the basis of the various procedures described above, will be described with reference to FIG. 2. The composition information stored in the composition information tables 52, 92 is referenced and compiled by the host device 10 or external terminal 20, via the disk adapters and the LAN 30.

In the host device 10 or external terminal 20, a microprogram is executed in order to deduce the settings, such as logical volumes which can be set, by referring to the composition information tables 52, 92, and the logical composition information thus established is stored in the composition information table 52 of the shared memory.

In this setting process, it is possible for a service processor to be disposed in the storage control device, this service processor being caused to execute processing via the external terminal, in such a manner that the composition information is established (updated) by the processor.

The channel adapters 40, 41, 80, 81, 82, 83 and the disk adapters 60, 61, 100, 101, 102, 103 update the control conditions by referring to the updated composition information table 52, and they control the input and output of data according to the new device composition.

Moreover, if a storage control device 120 and storage control device 130 are connected to the LAN 30 in this way, then the composition information table 52 stored in the shared memory 50 of the storage control device 120 is referenced and compiled by the channel adapter 41 and by the host device 10 or external terminal 20, via the LAN 30, and is then stored in the shared memory 90 of the storage control device 130, where it is referenced by the channel adapters 80, 81, 82, 83 and the disk adapters 100, 101, 102, 103, which modify the control conditions accordingly, and hence the composition information table 52 can be created in a simple fashion when storage control devices are operating in an environment where a plurality of external storage devices having the same composition are connected.

Figure 2:
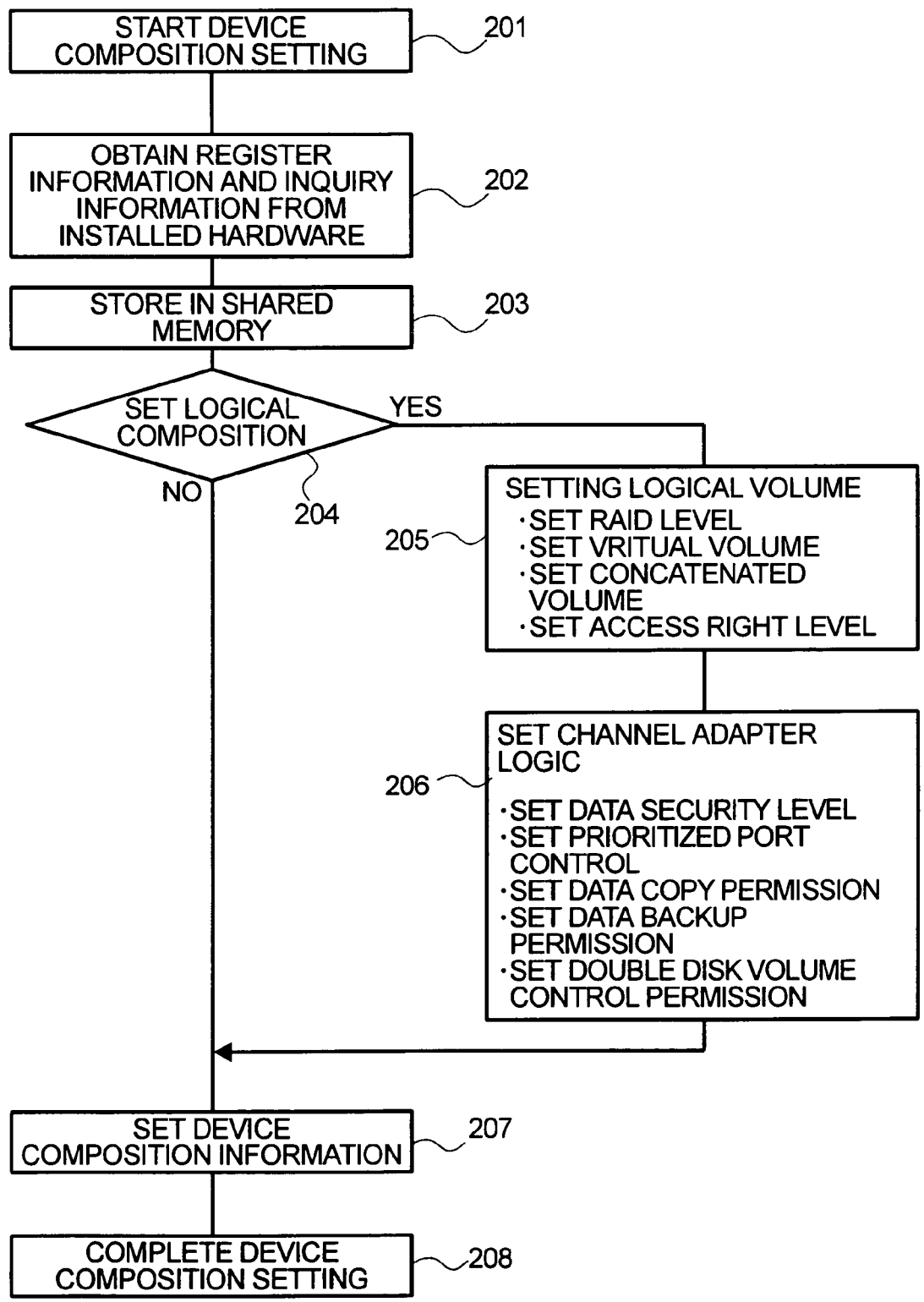
FIG. 2 is a flowchart showing the sequence of processing in an embodiment of the present invention.

FIG. 2 is a flowchart showing the detailed procedure of a creation processing program in a case where information relating to the hardware composition and information relating to the logical composition is created in composition information table 52, according to the aforementioned embodiment.

The flowchart in FIG. 2 shows, in particular, the operations of the microprocessors of the channel adapters 40, 41, 80, 81, 82, 83 and disk adapters 60, 61, 100, 101, 102, 103, and the host device 10 and external terminal 20. It begins with step 201 to start the device composition setting.

When the storage devices 120, 130 are started up, the microprocessors of the channel adapters 40, 41, 80, 81, 82, 83 and the disk adapters 60, 61, 100, 101, 102, 103 obtain the register information of the devices respectively connected thereto, in the initialization processing. As described by the flowchart in FIG. 3, the microprocessors provided in the disk adapters issue an inquiry command to the external devices connected thereto, thereby obtaining hardware type information from the external devices (Step 202).

The obtained register information is stored, together with the hardware type information, respectively in the composition information tables 52, 92 of the shared memory 50, 90 of the device in question (Step 203). In this case, if there is no matching hardware type, the information corresponding to the base information should be obtained and the required information stored in the composition information tables 52, 92, by means of any one of the procedures described in FIG. 3. Moreover, according to the second embodiment, relating device attribute information is selected on the basis of a match with the model name obtained by the hardware type information, and the required information is obtained and stored in the composition information table 52, from the attribute information contained in this device information.

In the host device 10 or external terminal 20, it is judged whether or not a change in the logical settings is necessary (Step 204), and if no such change is necessary, then the device composition information is established directly (Step 207).

If there is a need to change the logical settings, then logical volume items, such as the RAID level, virtual volume, concatenated volume, access right level, and the like, are set up (step 205), and channel adapter logic settings, such as data security level, prioritized port control, data copy permission, data backup permission, double disk volume control, and the like, are also made (step 206).

The various setting information is completed by storing the required information in the composition information table 52, as described above. The respective processors provided in the storage control device refer to this composition information table 52 for control information, and proceed with their respective processing according to the defined procedure.

In the present invention, by ensuring that the microprocessors perform definition of the composition information table by means of a prescribed algorithm, then after connecting a new external storage medium to the storage device, the procedure can be automated up to and including a step where the storage device is able to execute input and output requests from the host device, when the power is switched on.

Desirably, the algorithm describing the composition information should be one which utilizes the characteristics of the storage device to the full, including the response characteristics, and the like, but in any case, it should be set up to a state where the storage device is functioning, similarly to a generic device initialization program. Therefore, rather than installing a large number of complicated algorithms to achieve optimal adjustment, it is possible to adopt a method whereby the number of logical volumes which can be set is allocated from the capacity of the logical volume group, the allocation being made mechanically. Moreover, in a section where the user is able to select a desired format, it is possible to use a simple method for assigning default values.

The reason for this is that although there may be cases where a comparative difference arises in the overall characteristics of the storage control device due to the combined composition thereof, this is greatly dependent on the I/O tendency, i.e., the type of I/O issued by the host device. In other words, even if a variety of settings are made by the composition algorithm before accepting an I/O, this does not necessarily achieve the highest performance.

An efficient method for tuning the performance of the storage control device is one performed by referring to the I/O history information. The present invention firstly guarantees, automatically, a state wherein the storage control devices 120 and 130 can function. Thereby, after the storage control device has assumed an operating state, the device can be adjusted by referring to the operating history of the device, the adjustment being made either by the program algorithm or by the operator.

In the present invention, as described above, a storage control device was described as an example of an information processing device, and a hard disk drive forming a storage device was described as an example of an external device connected to the information processing device. The present invention is not limited to application to a storage control device and storage device, and may, for example, be applied to an information processing device and externally connected device such as a personal computer and a printer.

In the present invention, by providing a storage area for storing information identifying the type of external device connected to the information processing device and information identifying the characteristics of the external device, and provisionally determining the external device connected from information relating to the characteristics of an external device stored in the storage area, in cases where an external device of a type which is not present in the information processing device is detected, it is possible to achieve automatic initialization of the external device.

Provided that hardware type information (first information) and base type information (second information) is stored in mutual association in the storage area of the shared memory in the information processing device, as information for external devices which may possibly be connected, then the storage method adopted may naturally be a table format or an indexed format.

Moreover, a case was described wherein information indicating the type of composition of the information processing device and external device is stored as composition information in the shared memory, and a management information table 51 that stores the external devices which may possibly be connected in a table format is also stored in the storage area of the shared memory. The composition information table 52 and management information table 51 do not necessarily have to be located in the same memory, and may be situated in any location, provided that this can be accessed by the microprocessors performing the initializing operations of the information processing device.

As described above, according to the present invention, even in the case that information relating to a newly connected external device is not saved as management information by the storage device, it is still possible for the capabilities of the device to be obtained from another region and stored in the composition information table.

Moreover, even in a device which does not have base type information, it is judged whether or not there is similar information consecutive to the hardware type information, and if there is a prescribed degree of matching, then it is provisionally determined that the new device is an upper device of a matching device which is stored in the management information table, the device connection is permitted, and the required information can be defined using the attributes of a device stored in the management information table. Consequently, even if a new device has been connected, in virtually all cases, the composition setting of the device can be performed automatically.

By changing the threshold value for provisionally determining a device to be the same device, if there is a certain degree of matching, then it is possible for the operator him or herself to adjust the possibility of a device being started up securely, and the convenience of the settings.

Moreover, in this way, it is more efficient for the storage control device first to create a state where the storage control device functions, and then to perform adjustments, than to set up the composition information manually, by investigation. This is because, when an operational state has been assumed, the operating history of the device can be referenced and optimization can then be performing by reference the state of the device.

In the present embodiment, an example was described wherein matching from the beginning of the word was used as the reference for judging the matching of the hardware type information, but a method may also be conceived wherein a plurality of manufacturer's names are registered and matching with these names is judged.

The present invention was described in detail above with respect to preferred embodiments, but it is to be understood that various modifications, substitutions and improvements can be made with respect to same, without departing from the spirit and scope of the invention as defined in the attached claims.

What is claimed is:

1. An information processing device for connecting to one or more external devices, the information processing device comprising:
   a storage area configured to store information relating to a predetermined set of external devices, which is referenced when the one or more external devices to be connected to the information processing device are initialized, wherein the storage area comprises a first storage area for storing hardware type information including unique information assigned respectively to the predetermined set of external devices, and a second storage area for storing attribute information corresponding to the unique information assigned respectively to the predetermined set of external devices; and
   a processor configured to obtain hardware type information and base type information from a connected external device and to determine, for initializing the connected external device, whether or not the hardware type information obtained from the connected external device is stored in the first storage area, and if the obtained hardware type information is not stored in the first storage area, to initialize the connected external device by referring to the base type information relating to the connected external device obtained from the connected external device, and attribute information stored in the second storage area;
   wherein the processor is configured, if the obtained hardware type information is not stored in the first storage area, to initialize the connected external device as a specific one of the predetermined set of external devices if the base type information obtained from the connected external device is same as or interchangeable with the attribute information of the specific one of the predetermined set of external devices stored in the second storage area.

2. The information processing device of claim 1 wherein the base type information comprises at least one of a capacity and an emulation type of the connected external device.

3. The information processing device of claim 1 wherein the information processing device is a storage control device, and the one or more external devices are disk devices to be connected to the storage control device.

4. An information processing device for connecting to one or more external devices, the information processing device comprising:
  a storage area configured to store information relating to a predetermined set of external devices, which is referenced when the one or more external devices to be connected to the information processing device are initialized, wherein the storage area comprises a first storage area for storing hardware type information including unique information assigned respectively to the predetermined set of external devices, and a second storage area for storing attribute information corresponding to the unique information assigned respectively to the predetermined set of external devices; and
  a processor configured to compare base type information relating to characteristics of a connected external device obtained from the connected external device with the attribute information accumulated in the second storage area, and if the base type information matches the attribute information corresponding to the unique information assigned to one matching external device in the predetermined set of external devices, to initialize the connected external device by identifying the connected external device as the one matching external device.

5. The information processing device of claim 4 wherein the base type information comprises at least one of a capacity and an emulation type of the connected external device.

6. An information processing device for connecting to one or more external devices, the information processing device comprising:
  a storage area configured to store information relating to a predetermined set of external devices, which is referenced when the one or more external devices to be connected to the information processing device are initialized, wherein the storage area comprises a first storage area for storing hardware type information including unique information assigned respectively to the predetermined set of external devices, and a second storage area for storing attribute information corresponding to the unique information assigned respectively to the predetermined set of external devices; and
  a processor configured, if the obtained hardware type information is not stored in the first storage area, to compare the hardware type information obtained from a connected external device with the hardware type information stored in the first storage area, and to initialize the connected external device by using base type information corresponding to the hardware type information stored in the first storage area which most closely resembles the obtained hardware type information;
  wherein the processor is configured to initialize the connected external device by using the base type information corresponding to the hardware type information stored in the first storage area, if the obtained hardware type information and the stored hardware type information which most closely resembles the obtained hardware type information have a matching character string sequence of a preset minimum threshold.

7. The information processing device of claim 6 wherein the processor is configured, if the obtained hardware type information and the stored hardware type information which most closely resembles the obtained hardware type information do not have a matching character string sequence of the preset minimum threshold, to initialize the connected external device by referring to the base type information relating to the connected external device obtained from said connected external device, and attribute information stored in the second storage area.

8. The information processing device of claim 7 wherein the processor is configured, if the obtained hardware type information and the stored hardware type information which most closely resembles the obtained hardware type information do not have a matching character string sequence of the preset minimum threshold, to initialize the connected external device as a specific one of the predetermined set of external devices if the base type information obtained from the connected external device is same as or interchangeable with the attribute information of the specific one of the predetermined set of external devices stored in the second storage area.

9. A method for controlling initialization of an external device which is to be connected to an information processing device, the method comprising:
  obtaining hardware type information and base type information of a connected external device;
  determining whether or not the obtained hardware type information of the connected external device is present in a storage area of the information processing device for storing information relating to a predetermined set of external devices, wherein the storage area comprises a first storage area for storing hardware type information including unique information assigned respectively to the predetermined set of external devices, and a second storage area for storing attribute information corresponding to the unique information assigned respectively to the predetermined set of external devices; and
  if the obtained hardware type information is not present in the storage area, initializing the connected external device by referring to the base type information relating to the connected external device obtained from the connected external device, and attribute information stored in the second storage area;
  wherein if the obtained hardware type information is not stored in the storage area, the connected external device is initialized as a specific one of the predetermined set of external devices if the base type information obtained from the connected external device is same as or interchangeable with the attribute information of the specific one of the predetermined set of external devices stored in the second storage area.

10. The method of claim 9 wherein the base type information comprises at least one of a capacity and an emulation type of the connected external device.

11. A method for controlling initialization of an external device which is to be connected to an information processing device, the method comprising:
  obtaining hardware type information and base type information of a connected external device;
  determining whether or not the obtained hardware type information of the connected external device is present in a storage area of the information processing device for storing information relating to a predetermined set of external devices, wherein the storage area comprises a first storage area for storing hardware type information including unique information assigned respectively to the predetermined set of external devices, and a second storage area for storing attribute information corresponding to the unique information assigned respectively to the predetermined set of external devices; and if the obtained hardware type information is not present in the storage area, comparing the base type information relating to characteristics of the connected external device obtained from the connected external device with the attribute information accumulated in the second storage area, and if the base type information matches the attribute information corresponding to the unique information assigned to one matching external device in the predetermined set of external devices, initializing the connected external device by identifying the connected external device as the one matching external device.

12. The method of claim 11 wherein the base type information comprises at least one of a capacity and an emulation type of the connected external device.

13. A method for controlling initialization of an external device which is to be connected to an information processing device, the method comprising:
 obtaining hardware type information and base type information of a connected external device;
 determining whether or not the obtained hardware type information of the connected external device is present in a storage area of the information processing device for storing information relating to a predetermined set of external devices, wherein the storage area comprises a first storage area for storing hardware type information including unique information assigned respectively to the predetermined set of external devices, and a second storage area for storing attribute information corresponding to the unique information assigned respectively to the predetermined set of external devices; and
 if the obtained hardware type information is not present in the storage area, comparing the hardware type information obtained from the connected external device with the hardware type information stored in the first storage area, and initializing the connected external device by using the base type information corresponding to the hardware type information stored in the first storage area which most closely resembles the obtained hardware type information;
 wherein the connected external device is initialized by using the base type information corresponding to the hardware type information stored in the first storage area, if the obtained hardware type information and the stored hardware type information which most closely resembles the obtained hardware type information have a matching character string sequence of a preset minimum threshold.

14. The method of claim 13 wherein, if the obtained hardware type information and the stored hardware type information which most closely resembles the obtained hardware type information do not have a matching character string sequence of the preset minimum threshold, the connected external device is initialized by referring to the base type information relating to the connected external device obtained from said connected external device, and attribute information stored in the second storage area.

15. The method of claim 14 wherein, if the obtained hardware type information and the stored hardware type information which most closely resembles the obtained hardware type information do not have a matching character string sequence of the preset minimum threshold, the connected external device is initialized as a specific one of the predetermined set of external devices if the base type information obtained from the connected external device is same as or interchangeable with the attribute information of the specific one of the predetermined set of external devices stored in the second storage area.

16. The method of claim 13 wherein the base type information comprises at least one of a capacity and an emulation type of the connected external device.

* * * * *